April 4, 1944.  O. SINGER  2,346,089
SELF-LAYING TRACK FOR VEHICLES
Filed April 24, 1942  2 Sheets-Sheet 1
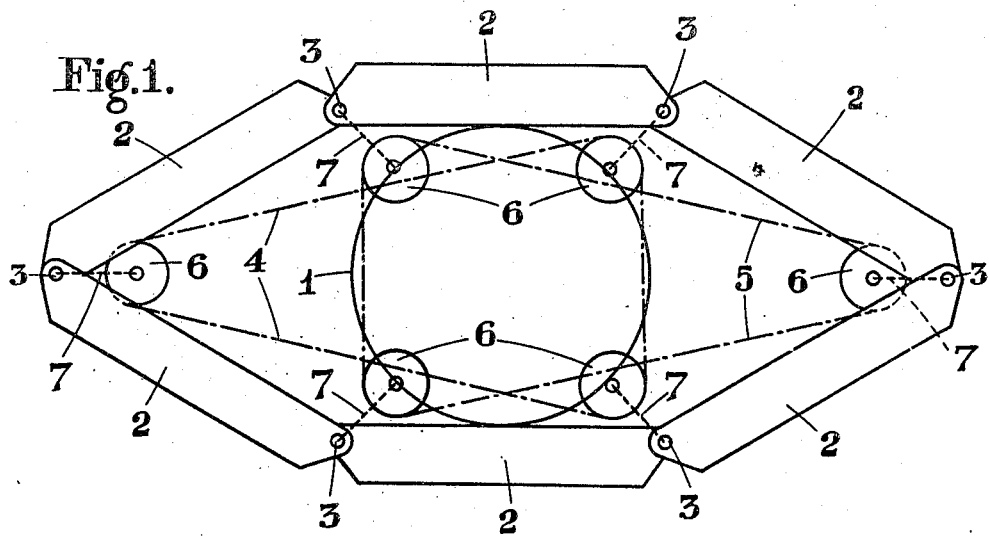
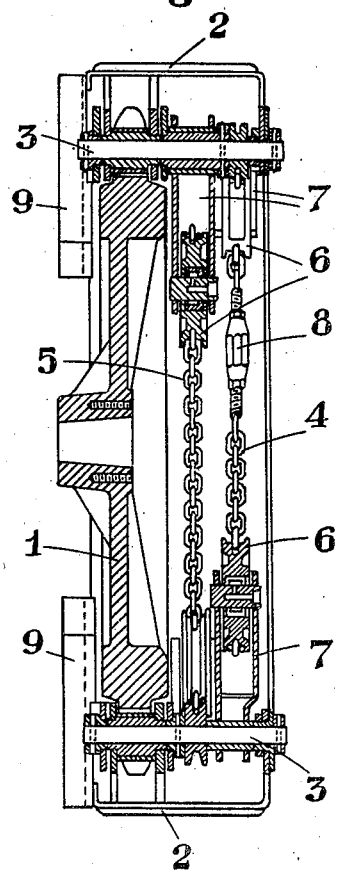
INVENTOR
OTTO SINGER
By Weehawken Groff

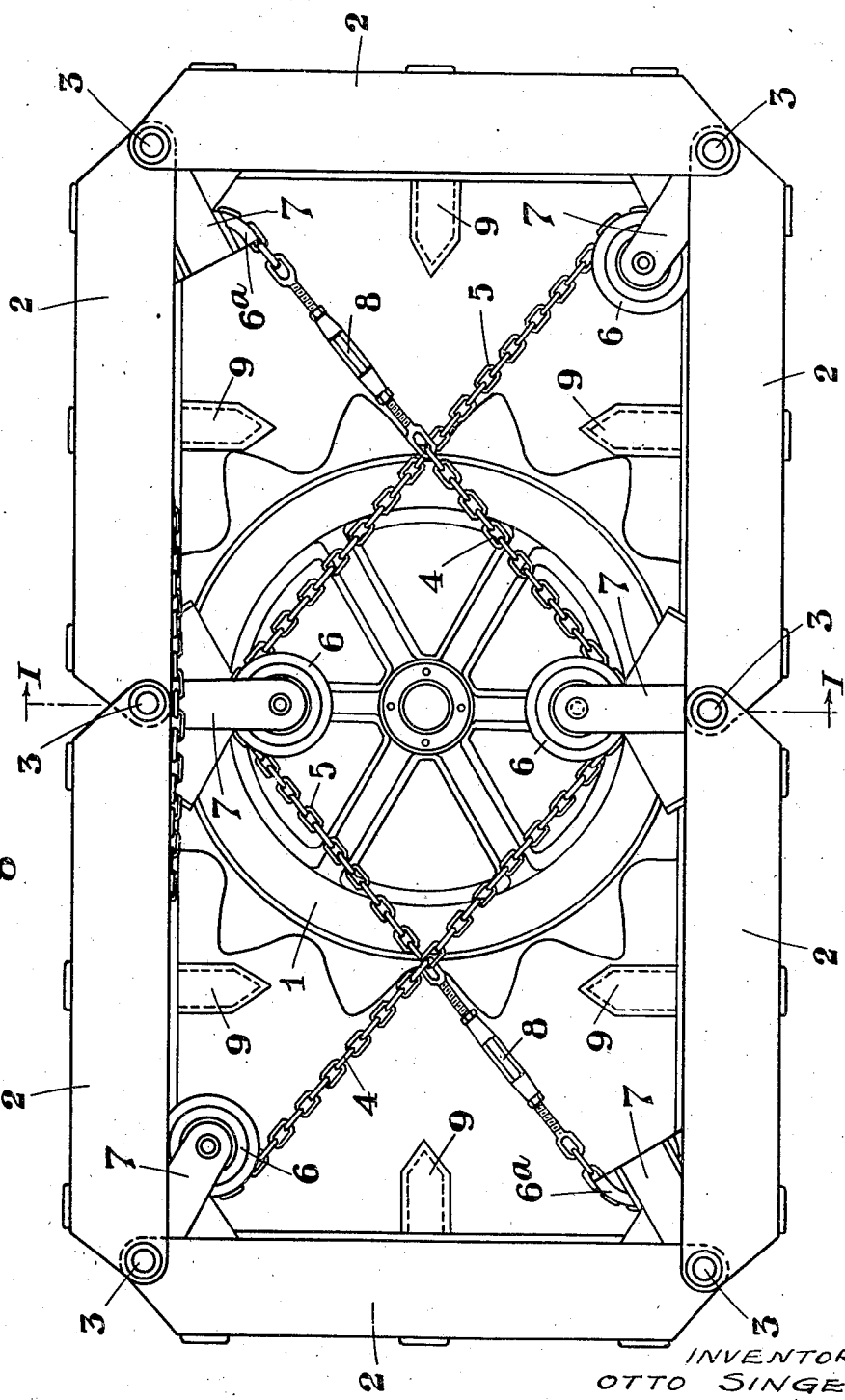

Patented Apr. 4, 1944

2,346,089

UNITED STATES PATENT OFFICE 2,346,089

SELF-LAYING TRACK FOR VEHICLES

Otto Singer, London, England

Application April 24, 1942, Serial No. 440,363
In Great Britain September 8, 1941

3 Claims. (Cl. 305—8)

This invention relates to self-laying tracks for vehicle and other wheels of the kind comprising a plurality of sections pivotally connected together in endless fashion and in use arranged so as to embrace at least one wheel which in its rotation causes the sections to be laid on the ground in succession and to be raised therefrom.

The invention is applicable to self-laying tracks as disclosed in my prior Patent No. 2,272,135 dated February 3, 1942 and particularly where there is employed a plurality of track sections of the same length adapted to engage the ground successively and surrounding at least one wheel, the track sections numbering two per wheel plus four, the length of each track section between its pivots being equal to the smallest distance apart of the axes of two parallel track sections. In my said prior patent extensible means (e. g. lazy tongs) are employed for connecting the track sections to one another and for maintaining diametrically opposite track sections in parallel position, with the ultimate object of avoiding impact shocks as the sections meet the ground. This result is achieved according to said prior patent because the various combinations of features cause the track sections to move with an angular speed which gradually diminishes and becomes nil on reaching the ground.

The present invention is concerned primarily with keeping the track sections in engagement with the wheel at the upper and lower points of its periphery. In attaining this object the means employed may be used to supplement lazy tongs or equivalent devices such as are illustrated and described in my said prior patent, or in certain instances may be used to replace these devices, fulfilling the dual function of keeping the track sections in contact with the wheel and for constraining the sections to contact the ground without shock.

Under certain conditions of use the track sections of prior self-laying tracks of the kind set forth may sag away from the base of the wheel and this may cause a rise of the opposite sections away from the top of the wheel, with the result that the track may become dislodged from the wheel. The object of the present invention is to provide simple, practical means whereby any such possibility is effectively avoided.

To enable the invention to be clearly understood and readily carried into effect, reference will now be made to the accompanying drawings, wherein:

Figure 1 is a diagrammatic side elevation of a self-laying track incorporating the flexible device provided by the present invention.

Figure 2 is a side elevation of the mechanism in detail to a larger scale than the Figure 1 diagram and showing the track sections in a different position from that which they occupy in Figure 1.

Figure 3 is a section taken on the line I—I of Figure 2.

Referring to the drawings, 1 indicates a wheel which is surrounded by a track consisting of six track sections 2 of equal length pivoted together at their ends by pivot pins 3. The length of each section 2, between its pivot pin centers, is equal to the distance between pivot pin centers of a pair of said sections which are disposed parallel to each other and engaged with the periphery of the wheel at diametrically opposite points.

According to the specific embodiment illustrated in the drawings, each pivot pin 3 has pivoted thereto and extending inwardly therefrom an arm 7 by which is carried a sheave 6. Also in accordance with the specific embodiment of the invention illustrated in the drawings, two flexible elements 4 and 5 in the form of chains are employed for cooperation with the sheaves 6 to maintain the track in engagement with the top and the bottom of the wheel 1.

Each of the flexible elements 4, 5 is endless or, in effect, is endless. One of said flexible elements, without any slack therein, extends over three alternate of the sheaves 6 and the other of said flexible elements, likewise without any slack therein, extends over the remaining three sheaves 6. The two flexible elements 4 and 5 in cooperation with the sheaves 6 thus serve to bridle the track sections and to constrain the track to remain at all times in engagement with the top and the bottom of the wheel 1.

Obviously, instead of the sheaves 6 or their equivalents being mounted on arms such as the arms 7 carried by the pivot pins 3, they may be mounted directly on said pivot pins, or, alternatively, and also obviously, the sheaves 6 or their equivalents may be mounted on the track sections 2 either directly or by means of arms such as the arms 7, at any desired points between the ends of said track sections, the functioning of the chains 4 and 5 or their equivalents being the same in any such case. Obviously, too, a single flexible element extending over all of the sheaves 6 or their equivalents in requisite order may be employed in lieu of two separate flexible elements.

The flexible element, or elements, may be truly endless and entirely free to creep or ride over the sheaves 6 as the track is advanced, or said element, or elements, may have its, or their, ends attached to one of the sheaves 6 or its equivalent. Moreover, regardless of whether there is employed only a single flexible element or two flexible elements, the element or elements, as the case may be, may include a turnbuckle, or turnbuckles, 8 for taking up slack therein and, if desired, may even include a spring or its equivalent for this purpose and to permit under certain conditions a certain amount of distension thereof. Furthermore, a flexible element, or elements, according to the invention obviously may be employed either entirely independently of, or in addition to, connecting links between the track sections 2 such as are illustrated and described in my aforesaid prior patent.

At 9 are indicated spuds which may be carried by the sections 2 in out-of-action positions as shown in Fig. 2, or which may be reversed to project outwardly from said sections to enter the rail or road surface over which the track may be travelling.

While the invention has been illustrated and described in connection with a single wheel track composed of six sections, the principles of the invention obviously may be incorporated in a two or more wheel track composed of a number of sections in excess of six.

Whilst the invention is applicable chiefly to self-laying tracks for vehicle wheels, it is to be understood that it is useful as a track carried around a wheel or wheels employed solely for towing the same to a site where the track system can be used as a supporting structure or framework for miscellaneous building purposes. In this connection the track sections may be used for example as the chief component in a supporting framework for emergency bridges, and the present invention, in this case, is employed as a means for transporting the same overland in the form of a self-laying track on a wheel or wheels and not necessarily as a support for a vehicle.

I claim:

1. A self-laying endless track comprising a plurality of equal-length track sections pivotally connected together in end to end relationship, a wheel within said track to roll upon the bottom reach thereof, a plurality of members corresponding in number to the number of sections in the track carried by said track and operatively connected therewith at points spaced equal distances apart therealong, and a pair of in effect endless flexible elements one engaged over alternate of said members and the other engaged over the remaining of said members and acting to bridle said track sections and to constrain the track to maintain contact with the top and the bottom of the wheel.

2. A self-laying endless track comprising a plurality of equal-length track sections pivotally connected together in end to end relationship, a wheel within said track to roll upon the bottom reach thereof, sheaves carried by the pivotal connections between said sections, and a pair of in effect endless flexible elements one engaged over alternate of said sheaves and the other engaged over the remaining sheaves and acting to bridle said track sections and to constrain the track to maintain contact with the top and the bottom of the wheel.

3. A self-laying endless track comprising a plurality of equal-length track sections pivotally connected together in end to end relationship, a wheel within said track to roll upon the bottom reach thereof, a plurality of arms corresponding in number to the number of sections in the track pivotally connected at their outer ends to the track at points spaced equal distances apart therealong and extending inwardly from the track, sheaves carried by said arms, and a pair of flexible in effect endless flexible elements one engaged over alternate of said sheaves and the other engaged over the remaining sheaves and acting to bridle said track sections and to constrain the track to maintain contact with the top and the bottom of the wheel.

OTTO SINGER.